United States Patent [19]

Jones

[11] 4,423,344
[45] Dec. 27, 1983

[54] LIQUID COOLED EDDY CURRENT COUPLING HAVING ROTOR EXTENSION RING

[75] Inventor: Thomas H. Jones, Wauwatosa, Wis.

[73] Assignee: Litton Industrial Products, Inc., Beverly Hills, Calif.

[21] Appl. No.: 237,047

[22] Filed: Feb. 23, 1981

[51] Int. Cl.³ .......................................... H02K 9/197
[52] U.S. Cl. ...................................... 310/105; 310/54
[58] Field of Search .................. 310/103, 102 A, 105, 310/90, 58, 54, 52

[56] References Cited

U.S. PATENT DOCUMENTS

| | | | |
|---|---|---|---|
| 3,050,647 | 8/1962 | Winther | 310/105 |
| 3,054,007 | 9/1962 | Munson | 310/105 |
| 3,184,626 | 5/1965 | Lueneberger | 310/105 |
| 3,214,618 | 10/1965 | Jaeschke | 310/105 |
| 3,372,292 | 3/1968 | Lynch et al. | 310/105 |
| 3,531,668 | 9/1970 | Cathey | 310/58 |

Primary Examiner—J. D. Miller
Assistant Examiner—D. L. Rebsch
Attorney, Agent, or Firm—John M. Haurykiewicz; Robert A. Seldon; Walter R. Thiel

[57] ABSTRACT

A liquid-cooled eddy-current coupling device is disclosed, having a field coil and rotatable inductor and rotor members within a housing, with the rotor member having a tubular extension with an exterior circumferential groove disposed to direct liquid coolant away from the field coil.

6 Claims, 2 Drawing Figures

LIQUID COOLED EDDY CURRENT COUPLING HAVING ROTOR EXTENSION RING

DESCRIPTION

TECHNICAL FIELD

An eddy current coupling device transmits torque between an input shaft connected to a prime mover and an output shaft connected to the load. Typically the eddy-current device is used to provide variable speed to the load when the prime mover operates at a constant speed, as is true, for example, for an a.c. induction motor.

In an eddy current coupling device, the input shaft typically rotates an inductor drum. A rotor member, commonly referred to as a pole structure, and typically comprising a plurality of arcuately spaced poles, is mounted on the output shaft concentric to the inductor drum. The flux of a field coil establishes magnetic poles in the rotor and induces eddy currents in the inductor drum as long as there is a relative speed—i.e. slip—between the rotor and drum. The electromagnetic interaction of the rotor pole flux and the drum eddy currents transmits torque, or turning force. The degree of energization of the field coil determines the amount of torque transmitted between the input and output shafts for a given slip speed condition.

BACKGROUND ART

The eddy currents and coil energization generate heat in the eddy current coupling. A cooling medium, such as air or water, is supplied to the coupling housing to carry off this heat.

In liquid cooled couplings, the coolant is usually introduced at the top of the housing and applied directly to the rotating parts, for example, the exterior of the inductor drum. The coolant splashes on the rotating parts to remove their heat and is collected in a drain at the bottom of the housing.

It will be appreciated that the presence of the coolant within the housing raises the possibility of moisture of the field coil. If such contamination occurs, electrical breakdown and premature failure of the coil can result.

The centrifugal action of the rotating parts tends to lessen contamination when the rotor and inductor drum are rotating by flinging the coolant away from the interiorly mounted coil. However, significant contamination can result from coolant dripping off the parts when they are stationary.

Such contamination can be resisted by encapsulating the coil in an impervious potting compound and/or hermetically sealing the coil in an enclosure, such as an annular copper can. However, these steps add to the manufacturing costs, reduce electrical efficiency, and are still subject to failure from thermal or other stresses.

DISCLOSURE OF THE INVENTION

The present invention is directed to an improved liquid cooled eddy current coupling construction in which protective means against coil contamination is incorporated in already existing parts of the coupling, specifically the rotor member. The present invention provides improved protection, while at the same time reducing the cost of the coupling by lessening or eliminating the need for encapsulation or enclosure of the coil.

Briefly, the invention is directed to an improved liquid cooled eddy current coupling having a housing with rotatable input and output shafts mounting the inductor drum and rotor member. The rotor member is located within the inductor and an annular field coil is, in turn, positioned within the rotor member. A coolant inlet supplies coolant to the interior of the housing along the exterior of the inductor drum. A coolant outlet removes the coolant from the housing.

The rotor has a tubular extension on one end thereof having an exterior circumferential groove forming a channel for receiving and discharging coolant runnoff from the inductor drum and rotor member to direct same away from the field coil. The field coil typically has a stationary support mounted on the housing and the extension extends along the coil support in a close running seal with that element and with associated portions of the housing. The groove may be formed by a conical portion converging towards the groove and forming one side thereof. Th tubular extension has a terminal lip forming the other side of the groove.

BEST MODE FOR CARRYING OUT INVENTION

Figure 1:
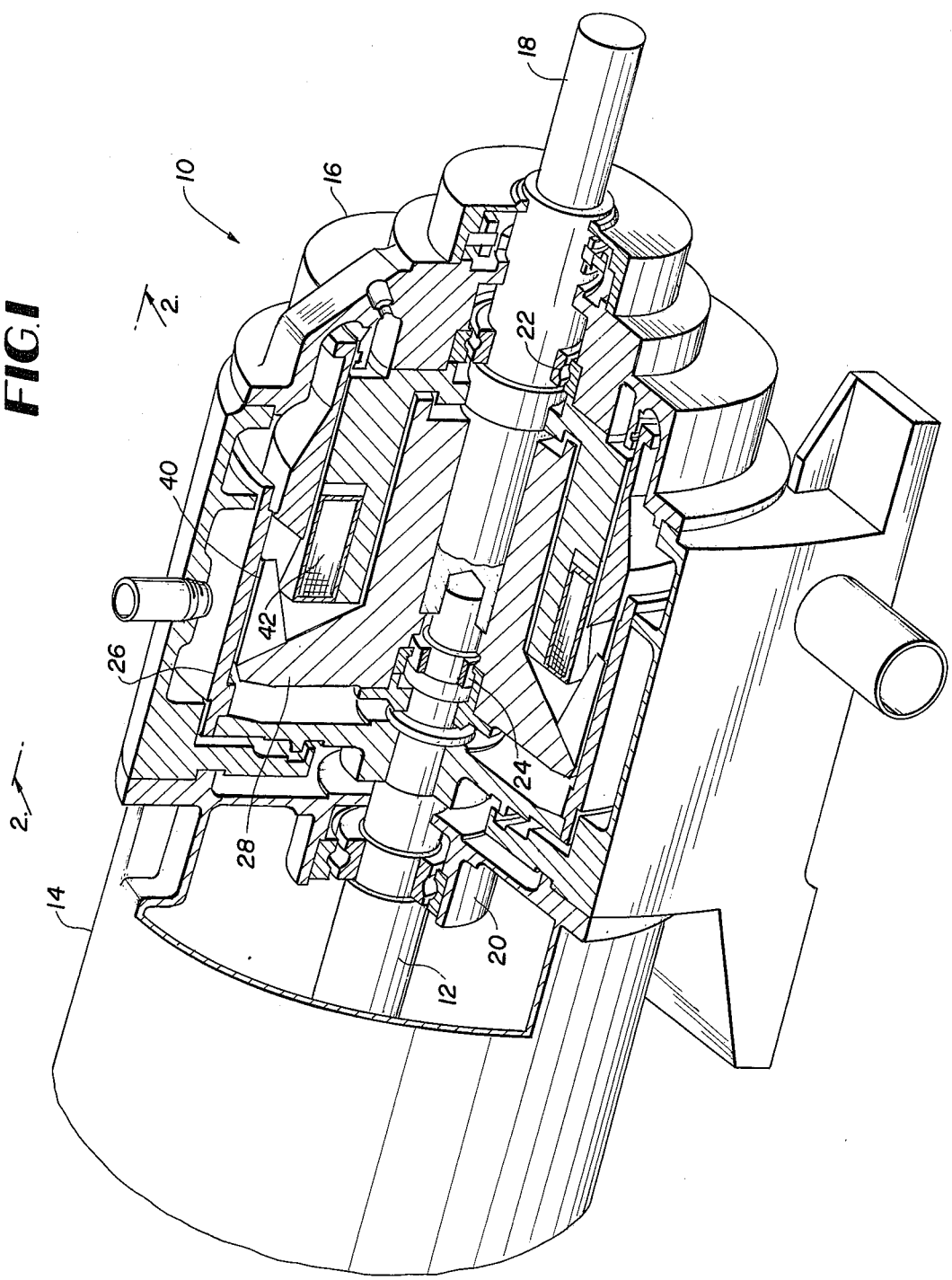
FIG. 1 is a partially cut away perspective view of an improved eddy current coupling of the present invention.

FIG. 1 shows an eddy current coupling device 10. Eddy current coupling 10 includes input shaft 12. Input shaft 12 is connected to a prime mover such as an a.c., constant speed induction motor 14 bolted to the housing 16 of the coupling device. Output shaft 18, coaxial with input shaft 12, is connected to the load, not shown, that is to be driven at variable speed.

Figure 2:
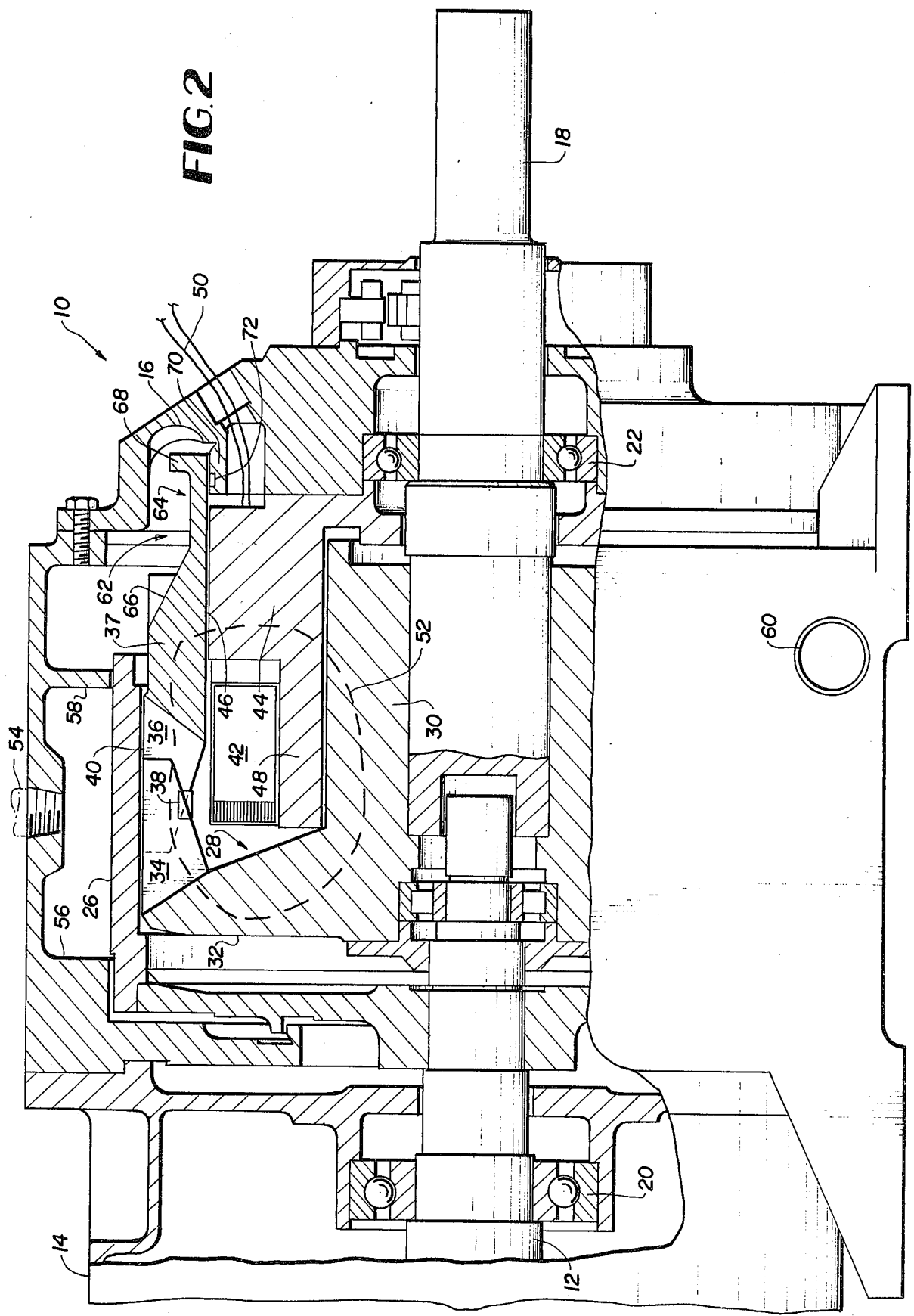
FIG. 2 is a detailed cross-sectional view taken along the line 2—2 of FIG. 1.

Shaft 12 is supported by two bearings in the motor, one of which is not shown, and the other of which is identified by the reference numeral 20 in FIG. 2. The output shaft 18 is supported by a bearing 22 and by a pilot bearing 24.

The magnetic coupling between input shaft 12 and output shaft 18 takes place between an inductor drum 26 mounted on input shaft 12 and a rotor 28 mounted on output shaft 18. Because of the considerable heat generated in inductor drum 26, it is common to utilize the inductor as the exterior member and to mount it on constant speed input shaft 12. As illustrated in FIGS. 1 and 2, inductor drum 26 is cup-like member of high magnetic permeability and electrical conductivity.

Rotor 28, on output shaft 18, includes a hub 30 keyed to output shaft 18. A collar portion 32 extends from the hub 30 to a first set of poles 34 mounted on the periphery of rotor 28. The first set 34 and a second set of poles 36, interdigitated with the first set, are mechanically joined to opposite sides of a nonmagnetic structure, such as a band 38. Pole sets 34 and 36 are spaced from inductor drum 26 by circumferential air gap 40. Rotor poles 36 extend from ring 37.

A field coil 42 is concentrically mounted radially within the rotor 28 on a field coil support 44. The field coil support 44 is somewhat L-shaped, having a first arm 46 that is fastened to the housing 16 and a second arm 48 that extends beneath the coil 42. Coil leads 50 extend through arm 46 and housing 16 for energizing the coil. A "J" or "U" shaped coil support bracket could be employed without departing from the spirit of the invention.

In operation, field coil 42 is energized with direct current through leads 56 to provide an encircling flux 52 shown by the dotted lines in FIG. 2. The flux 52 passes from one pole set 34 through inductor drum 26, driven by motor 14, to the adjacent rotor pole set 36. The rotation of the drum 26 through flux 52 generates eddy currents in the drum 26. The eddy currents react with the flux to transmit torque from the drum to the rotor 28 and, accordingly, to output shaft 18. The amount of torque that can be transmitted at a given slip speed (and, therefore, at a given output speed) is determined by the field strength of the field coil 42.

Housing 16 contains coolant inlet 54 at the top thereof by which coolant may be applied to the exterior of inductor drum 26. Housing wall 56 and baffle 58 channel the coolant on the exterior of the inductor drum and deliver it to drain 60 located in the bottom of housing 16. In the past, coolant escaping from the surface of inductor drum 26 beneath baffle 58 has found its way to coil 42 and caused contamination of the coil.

To avoid such contamination, the eddy current coupling of the present invention provides tubular extension 62 on rotor 28. Extension 62 may be mounted on rotor pole ring 37 and contains an exterior circumferential channel 64 in the extension for receiving and discharging coolant passing under baffle 58. Channel 64 may be formed, in part, by conical portion 66 converging in a direction toward the groove and forming one side thereof. The other side of the groove is formed by a terminal lip 68 that may be lower in height than ring 37. Extension 62 and channel 64 prevent field coil 62 from being exposed to the coolant in housing 16 both when the coupling is stationary and when it is operating.

The interior surface of extension 62 forms a close running seal with arm 46 of coil support 44, further lessening the likelihood of contamination of field coil 42.

Housing 16 may be provided with collar 70 adjacent arm 46 that also forms a close running seal with the interior surface of extension 62. Collar 70 also has a groove 72 that permits drainage of coolant to outlet 60. This further lessens the likelihood of contamination of field coil 42.

The invention is not to be taken as limited to all of the details thereof as modifications and variations thereof may be made without departing from the spirit or scope of the invention.

What is claimed is:

1. A liquid cooled eddy current coupling comprising:
  a housing having rotatable input and output shafts;
  a generally tubular inductor member mounted on one of said input and output shafts for rotation therewith;
  a magnetic rotor member mounted on the other of said input and output shafts for rotation therewith, said rotor member being located within said inductor member and having a plurality of poles aligned with said inductor member and separated therefrom by a circumferential air gap;
  an annular field coil positioned with said rotor member, said field coil generating an encircling magnetic flux causing torque transmission between said inductor and rotor members and said input and output shafts;
  a coolant inlet for supplying coolant to the interior of said housing along the exterior and above the midpoint of said inductor member;
  said rotor member having a tubular extension extending from said aligned portions of said rotor member and inductor member, said extension having an exterior circumferential groove therein forming a channel for receiving and discharging coolant from said inductor and rotor members where said channel is disposed on said extension such that coolant is prevented from reaching said coil when said rotor is stationary; and
  a coolant outlet for removing coolant from the interior of said housing.

2. The coupling according to claim 1 further including a stationary coil support mounted on said housing for positioning said field coil inwardly of said rotor member and wherein said extension extends along said coil support and forms a close running seal therewith.

3. The coupling according to claim 1 wherein said tubular rotor member extension has a conical portion connecting cylindrical surfaces of said rotor and converging towards said exterior circumferential groove and forming one side thereof, said tubular extension having a terminal lip forming the other side of said groove.

4. The coupling according to claim 3 wherein the height of said lip is less than that of said rotor member 5. The coupling according to claim 2 wherein said housing has an annular collar extending therefrom and wherein said tubular extension extends over said collar along its exterior and wherein said collar and said extension are disposed in the flow path of said coolant upstream of said field coil.

6. The coupling according to claim 5 wherein said collar has an annular groove in the exterior thereof for draining coolant to said outlet.

* * * * *